Sept. 19, 1933.  E. WOOLER  1,927,534

ROLLER BEARING FOR ROCKER ARMS AND THE LIKE

Filed July 16, 1931

Fig. 1.

Fig. 2.

INVENTOR:
Ernest Wooler,
by Carr Han & Gravely
HIS ATTORNEYS.

Patented Sept. 19, 1933

1,927,534

UNITED STATES PATENT OFFICE 1,927,534

ROLLER BEARING FOR ROCKER ARMS AND THE LIKE

Ernest Wooler, Canton, Ohio, assignor to The Timken Roller Bearing Company, Canton, Ohio, a corporation of Ohio Application July 16, 1931. Serial No. 551,126

3 Claims. (Cl. 308—214)

My invention relates to roller bearings for rocker arms of internal combustion engines and like devices whose movement is a rapid rocking or oscillating movement instead of a continuous rotary movement. The invention has for its principal object a bearing which is especially adapted for such conditions. The invention consists in the roller bearing for rocker arms and the like and in the parts and combinations and arrangements of parts hereinafter described and claimed.

In the accompanying drawing,

Fig. 1 is a longitudinal sectional view of a rocker arm bearing embodying my invention; and Fig. 2 is a similar view on a smaller scale showing said bearing in position on a rocker arm.

The outer bearing member of the bearing is an integral double cup 1 having conical raceway portions 2 tapering toward the middle of the cup and having an external annular rib 3 at one end constituting an abutment for the bearing receiving portion of a rocker arm 4. The drawing shows only the cup receiving end of said rocker arm 4, such rocker arm constructions being so well known as to require no further illustration.

Two separate cones 5 or inner bearing members are provided, two series of conical rollers 6 being interposed between said cones and said cup. The large outer ends of said cones 5 are provided with thrust ribs 7 for the large ends of said rollers 6. The small ends of said cones abut against each other and a plurality of radial openings or notches 8 are provided in said small ends. The small ends of said cones are beveled off around their inner peripheries, said beveled portions forming a circumferential passageway 9 around the pin or shaft 10 on which the bearing and rocker arm are mounted. Said annular passageway 9 receives lubricant from an axial passageway 11 and a communicating radial passageway 12 in said pin 10 and then transmits said lubricant to the bearing through the radial passageways formed by said notches 8 in the ends of said cones.

After the rollers and cones have been assembled in the cup, closure rings 13 are spun into annular grooves 14 formed in the outer ends of the bore of said cup. These closure rings retain lubricant in the bearing and also keep the parts in assembled position prior to the mounting of the bearing on said pin.

The bearing is made and mounted in position so that there is considerable looseness, thereby permitting endwise movement of the cup and rocker arm with respect to the shaft, the cones being tight on the shaft. In airplane engine rocker arm mountings, for example, the bearing adjustment may be .001 to .005 inch loose, thus permitting that much endwise movement to the cup. This looseness permits the parts to run freely and prevents binding of the parts and brinelling of the cones on the mounting pin.

What I claim is:

1. A roller bearing for rocker arms and the like comprising an integral cup with raceway portions tapering toward the middle thereof, a pair of cones, conical rollers between said cup and the respective cones, said cones having radial lubricant passageways at their abutting inner ends, and closure rings spun into the ends of the bore of said cup to maintain the parts in assembly and to retain lubricant.

2. A roller bearing for rocker arms and the like comprising a pin, a pair of bearing cones mounted thereon with their smaller ends abutting, said cones being notched at their abutting ends and having their bores flaring at their abutting ends, whereby the assembled cones have an annular lubricant passageway around their inner periphery and radial lubricant passageways communicating therewith, said pin having a lubricant passageway communicating with said annular passageway, conical bearing rollers on each of said bearing cones, and an integral cup with a raceway portion in each end for one series of rollers.

3. A roller bearing for rocker arms and the like comprising a pin, a pair of bearing cones tightly mounted thereon with their smaller ends abutting, said cones being notched at their abutting ends and having their bores flaring at their abutting ends, whereby the assembled cones have an annular lubricant passageway around their inner periphery and radial lubricant passageways communicating therewith, said pin having a lubricant passageway communicating with said annular passageway, conical bearing rollers on each of said bearing cones, and an integral cup with a raceway portion in each end for one series of rollers, said bearing being loosely adjusted to permit endwise movement of said cup.

ERNEST WOOLER.